United States Patent Office 3,757,001
Patented Sept. 4, 1973

3,757,001
METHOD FOR SUSPENSION POLYMERIZATION OF VINYL CHLORIDE
William M. Reiter, Mentor, Ohio, and Algirdas A. Reventas, Rockaway, N.J., assignors to Allied Chemical Corporation, New York, N.Y.
No Drawing. Filed Apr. 16, 1971, Ser. No. 134,908
Int. Cl. C08f 3/32, 15/06
U.S. Cl. 260—92.8 W                              11 Claims

ABSTRACT OF THE DISCLOSURE

In suspension polymerization of vinyl chloride in aqueous media in closed polymerization vessels in the presence of conventional suspending agents and oil-soluble polymerization initiators, adhesion of polymer to the inner wall of the polymerization vessel is eliminated or substantially reduced by (1) conducting the polymerization in an acidic aqueous medium, in conjunction with (2) presence during the polymerization in the polymerization mass of oxidized polyethylene having a minimum number average molecular weight of about 1000, containing between about 1 and 5% by weight of oxygen, and having an acid number of from 9 to about 35.

SUMMARY OF THE INVENTION

The present invention relates to suspension polymerization of vinyl chloride, and to suspension copolymerization of vinyl chloride with other ethylenically unsaturated monomers copolymerizable therewith wherein vinyl chloride is employed in amount of at least 50% of the monomer mixture, which polymerization is conducted in an aqueous medium in the presence of conventional suspending agents and of conventional organic peroxide initiators, and which polymerization is characterized in that it is conducted, in combination, (1) in an acidic aqueous medium having a pH of less than 7, and (2) in the presence, in the polymerization mass, of oxidized polyethylene having a minimum number average molecular weight of about 1000, as determined by high temperature vapor pressure osmometry, containing between about 1% and about 5% by weight of oxygen, and having an acid number of from 9 to about 35. Use of an acidic aqueous polymerization medium in conjunction with presence during the polymerization of the oxidized polyethylene prevents or substantially reduces adhesion of polymer to the inner wall of the polymerization vessel, especially if the inner wall is glass-lined, as is conventional.

BACKGROUND OF THE INVENTION

Polyvinyl chloride is conventionally prepared by polymerization in aqueous media containing suspending agents such as gelatin, polyvinyl alcohol or methyl cellulose, using organic peroxides such as lauroyl peroxide or diisopropylperoxy dicarbonate as initiator. During the polymerization small amounts of chlorine are split off in the form of hydrochloric acid. Therefore, to maintain the pH of the aqueous polymerization medium at the desired level, mainly near the neutral point, small amounts of alkali metal phosphates or carbonates are often added as buffer. Suspension polymerization of vinyl chloride on commercial scale generally is carried out batchwise, usually in glass-lined agitated vessels of several thousand gallons capacity.

As is well-known to those familiar with manufacture of suspension polyvinyl chloride, considerable amounts of polymer tend to deposit on the inner surfaces of the polymerization vessel. To maintain commercially required standards of product quality, these deposits must be physically removed before the following batch is started. Especially hard polymer deposits are formed at and above the level of the liquid vapor interface. These deposits are especially difficult to remove. Spraying with high pressure water jets, a conventional cleaning procedure, does not always succeed in dislodging these deposits, and on periodic basis the entire inner surface of the reactor must be hand scraped. These cleaning operations are time consuming, expensive, expose operators to potentially hazardous conditions and seriously affect the efficiency of the polymerization operation. Incomplete cleaning, however, may cause carry-over of some of the adhesion polymer into the product of the next batch, causing high gel or "fish-eye" content of the resin product. Fish-eyes are gelatinous particles which do not readily absorb plasticizer and thus appear as discreet gel particles in the finished plasticized product, such as sheeting, extrusions, etc., adversely affecting appearance and reducing the electrical insulating properties of the product.

Generally, it is therefore an object of the present invention to advance the art of suspension polymerization of vinyl chloride by providing a method of polymerization in which the formation of polymer deposits which adhere to the polymerization vessel is greatly reduced or eliminated.

DETAILED DESCRIPTION OF THE INVENTION

In accordance with the present invention, there is provided a process for suspension polymerization of vinyl chloride in an aqueous medium in the presence of suspending agent, using oil-soluble organic peroxide initiator, which process is characterized in that the aqueous polymerization medium is maintained throughout the polymerization at an acidic pH of less than 7, and in that the polymerization is carried out in the presence of oxidized polyethylene having a minimum number average molecular weight of about 1000, as determined by high temperature vapor pressure osmometry, containing between about 1% and about 5% by weight of total oxygen, and having an acid number of from 9 to about 35.

The vinyl chloride suspension polymerization process in accordance with the present invention is conventionally conducted at temperatures between about 40 and about 70° C., more preferably between about 50 and about 65° C., and at pressures of about 70 to about 150 p.s.i.g., more preferably about 90 to about 125 p.s.i.g., advantageously at autogeneous pressures as may prevail at chosen polymerization temperature. Suitable water to monomer ratios, on a weight basis, range between about 1:1 and about 3:1, water to monomer ratios between about 1.2:1 and about 2:1 being prefererd, and ratios of about 1.25:1 and about 1.5:1 being more preferred yet.

As above stated, the aqueous polymerization medium is critically maintained in the acidic region at pH of less than 7, preferably at a pH of between about 1 and about 6, and, more preferably yet, between about 2 and about 5. The means by which the acidic pH of the polymerization medium is established and maintained are not especially critical. The acidic conditions of the aqueous medium may, for example, be established by addition thereto of an inorganic acid, such as hydrochloric acid, sulfuric acid, or phosphoric acid, or of an inorganic acid salt such as acid phosphates or acid sulfates, especially those of aluminum. If desired, the acidic pH of the aqueous polymerization medium may be maintained within narrow ranges throughout the polymerization reaction by use of known types of buffer systems. Preferably, the required acidic pH is established by addition of phosphoric acid.

The oxidized polyethylene employed in the process of the present invention is characterized by having a minimum number average molecular weight of about 1000, preferably at least about 1200, as determined by high temperature vapor pressure osmometry, containing between about 1 and about 5% by weight of total oxygen, and having an acid number of from about 9 to about 35. It is obtained by oxidation of polyethylene, in molten or finely divided solid form, with free oxygen-containing gas, usually air, generally at elevated temperature, until the desired oxygen content is obtained. Starting materials for making the oxidized polyethylene suitable for use in the present invention include the low molecular weight, low density polyethylene waxes having densities in the range of about .91 to about .96 as, e.g. prepared by the process disclosed in U.S. Pat. 2,683,141 to Erchak, as well as high density, linear polyethylene as, e.g. prepared by use of the well-known "Phillips" or "Ziegler" type catalyst systems, having densities in the range of about 0.93 to 0.97 or above. The low molecular weight, low density polyethylene starting material can be oxidized by contacting it in the melt with a stream of air until the desired oxygen content has been obtained. The high density, linear polyethylene starting material is usually oxidized by contacting it, preferably in finely divided solid form, with free oxygen-containing gas, usually air, at temperatures ranging from about 100° C. up to but not including the crystalline melting point of the polyethylene until the desired oxygen content has been obtained.

A suitable low molecular weight, low density oxidized polyethylene is available from Allied Chemical Corporation under the designation AC–629. This oxidized polyethylene product has a specific gravity of about 0.9±0.05, a number average molecular weight of about 1800, an oxygen content of between about 3 and 5 and an acid number of about 14 to 17. A suitable high density, linear polyethylene is likewise commercially available from Allied Chemical Corporation, under the designation AC–392. This product has a specific gravity of about 0.99, a number average molecular weight of about 2500, an oxygen content between about 2 and 3 and an acid number of about 25 to 35.

The oxygen content and acid number of oxidized polyethylene suitable for use in the polymerization method of the present invention may be determined as follows:

The oxygen content may suitably be determined by instrumental method using the Oxygen Analyzer Model No. 534-300 manufactured by the Laboratory Equipment Corporation, St. Joseph, Mich. In this instrument, a sample of the oxidized polyethylene is heated in a carbon crucible in a stream of oxygen-free argon. Oxygen contained in the sample is converted to carbon monoxide, which is oxidized to carbon dioxide by contact with iodine pentoxide. The co-liberated iodine is trapped in sodium thiosulfate and the carbon dioxide is measured in a conductometric cell containing barium hydroxide solution whereof change in conductivity (in ohms) has been calibrated against a pure oxide standard.

Acid number is determined by titration with alcoholic potassium hydroxide of a solution of the sample in a suitable solvent, e.g. benzene or toluene.

The oxidized polyethylene, in accordance with the present invention, is added to the polymerization medium in amount of between 0.05 and 5%, preferably in amount of between 0.1 and 1, more preferably yet in amount of between 0.1 and 0.5% by weight, based on the weight of the monomer charge. If used in amount of less than about 0.05% by weight, beneficial results are generally not obtained. Use of the oxidized polyethylene in amount of more than about 0.5% by weight, although effective in reducing adhesion of polymer to the polymerization vessel, tends to degrade certain properties of the resin product, such as clarity and melt viscosity, and is, for that reason, preferably avoided when it is desired to obtain resin of high clarity and/or relatively low melt viscosity. The oxidized polyethylene is preferably added to the polymerization medium before initiation of polymerization, but in any event before more than about 10% of the initial monomer charge has been polymerized.

The suspension polymerization process of the present invention utilizes the usual suspending agents, such as polyvinyl alcohol, gelatin, methyl cellulose, polyvinyl pyrollidone, and the like, which are commonly employed in suspension polymerization of vinyl chloride. As is conventional, the suspending agents are employed in amounts ranging between about 200 and about 1000 p.p.m., based on the weight of the monomer charge, more preferably in amounts ranging between about 300 and about 700 p.p.m.

Suitable polymerization initiators include the conventional oil-soluble organic peroxides such as, for example, lauroyl peroxide, benzoyl peroxide, 2,4-dichlorobenzoyl peroxide, diisopropyl peroxydicarbonate, and the like as well as the azo compounds, such as diazo butyronitrile. The polymerization initators may be added initially, or, in order to maintain desired polymerization rates, intermittently or continuously throughout the polymerization.

As stated above, the present invention is applicable to polymerization of vinyl chloride alone or together with other ethylenically unsaturated monomers. Suitable co-monomers include, for example, vinylidene fluorochloride and the like; unsaturated hydrocarbons, such as ethylene, propylene, isobutene and the like; allyl compounds, such as allyl acetate, allyl chloride, allyl ethyl ether and the like; and conjugated and cross-conjugated ethylenically unsaturated compounds, such as butadiene, isoprene, chloroprene, divinyl ketone and the like. For a fairly complete list of materials known to polymerize with vinyl chloride, reference is made to Krczil, "Kurzes Handbuch der Polymerisations Technik—II Mehrstoff Polymerisation," Edwards Bros. Inc. (1945), pp. 735–747, the items under "Vinyl Chloride."

The following example further illustrates the present invention and sets forth the best mode contemplated for its practice. It is not intended to be a limitation on the invention.

Example

A thirty gallon glass-lined reactor equipped with agitator was charged with the following: demineralized water, 97 lbs.; vinyl chloride, 73 lbs.; polyvinyl alcohol (suspending agent), 50 grams; disodium phosphate, 8 grams; dioctyl phthalate, 137 grams; a silicone antifoam agent, 14 grams; lauroyl peroxide, 6 grams; and diisopropyl peroxydicarbonate, 25 ml. of a 30% solution in toluene. The above charge is hereinafter referred to as "basic recipe." To this basic recipe there was added phosphoric acid in amount sufficient to bring the pH of the aqueous medium to 2.5 (25 ml. of 75% aqueous $H_3PO_4$), and 33 grams of finely divided oxidized low density polyethylene AC–629, as above described. Polymerization was conducted at a temperature of 56° C. until a pressure drop from the originally indicated 120 p.s.i.g. to 90 p.s.i.g. occured (between 5 and 6 hours), whereupon the reactor was vented and drained. This run was repeated 3 times for a total of 4 consecutive runs, using the identical formulation, without cleaning the reactor between runs. After the fourth run the reactor was opened, polymer deposits were scraped from the walls, were dried and were weighed. There were thus collected a total of 52 grams of polyvinyl chloride which had adhered to the walls. These deposits were soft and could readily be removed.

Similar results are obtained when oxidized high density polyethylene AC–392, as above described, is substituted for the oxidized low density oxidized polyethylene.

Comparative tests (a) The series of four runs, as described above, was repeated using the basic recipe together with the oxidized polyethylene AC–629, all in the amounts indicated above, but omitting addition of the phosphoric acid, so that polymerization was conducted in a medium having pH of more than 7. The polymer deposits collected from the reactor walls after the fourth run, after drying, amounted to 90 grams.

(b) The series of four runs as described in the example, above, was repeated twice using the basic recipe together with the phosphoric acid, in amount indicated above, but omitting the oxidized polyethylene. The polymer deposits collected from the reactor walls after the fourth run, after drying, in two separate series of 4 runs each, amounted to 92 and 116 grams.

(c) The series of four runs as described in the example, above, was repeated using a variety of waxes, including paraffin wax, micro crystalline wax, and low molecular weight unoxidized polyethylene having molecular weight of about 2000. The polymer deposits collected from the reactor walls after the last in the series of four runs, after drying, weighed at least 94 grams.

From the foregoing, it is apparent that the efficacy of oxidized polyethylene at acidic pH in reducing reactor fouling in suspension polymerization of vinyl chloride is entirely unexpected and surprising.

Furthermore, suspension polyvinyl chloride resin made by the polymerization method in accordance with the present invention unexpectedly exhibits improved drying characteristics on separation from the aqueous polymerization medium, and it has improved plasticizer absorption. Suspension polyvinyl chloride resins made by the process of the present invention in the presence of at least 0.1% of oxidized polyethylene have pronounced hydrophobic characteristics, hence require less drying time.

Since various changes and modifications may be made in the invention without departing from the spirit and essential characteristics thereof, it is intended that all matter contained in the above description shall be interpreted as illustrative only, the invention being limited only by the scope of the appended claims.

We claim:

1. In a process for suspension polymerization of vinyl chloride in an aqueous polymerization medium in the presence of suspending agent using oil-soluble organic peroxide initiator, the improvement which comprises, in combination, conducting the polymerization (a) in an aqueous medium having an acidic pH of less than 7, and (b) in the presence of between about 0.05 and 5 percent by weight, based on the weight of the monomer charge, of oxidized polyethylene having a minimum number average molecular weight of about 1000, as determined by high temperature vapor pressure osmometry, containing between about 1 percent and about 5 percent by weight of total oxygen, and having an acid number of from about 9 to 35, obtained by oxidation of polyethylene having density in the range of 0.91 to 0.97 with free oxygen-containing gas at elevated temperature.

2. The process of claim 1 wherein the aqueous medium has a pH of between about 1 and 6.

3. The process of claim 2 conducted at a temperature of between 40° and 70° C.

4. The process of claim 3 wherein the oxidized polyethylene has a minimum number average molecular weight of about 1200, an oxygen content of from about 3 percent to 5 percent by weight, and an acid number of from about 14 to 17.

5. The process of claim 4 conducted in a glass-lined vessel.

6. The process of claim 3 wherein the oxidized polyethylene has a minimum number average molecular weight of about 2500, an oxygen content of from about 2 percent to 3 percent by weight, and an acid number of from about 25 to 35.

7. The process of claim 1 wherein the aqueous medium has a pH of between about 2 and 5, which has been established by addition of phosphoric acid, wherein the oxidized polyethylene is employed in amount of from 0.1 to 1 percent by weight, based on the weight of the monomer charge, and wherein the polymerization is conducted at a temperature of between 40° and 70° C.

8. The process of claim 7 wherein the oxidized polyethylene has a minimum number average molecular weight of about 1200, an oxygen content of from about 3 percent to 5 percent by weight, and an acid number of from about 14 to 17.

9. The process of claim 8 conducted in a glass-lined vessel.

10. The process of claim 7 wherein the oxidized polyethylene has a number average molecular weight of about 2500, an oxygen content of from about 2 percent to 3 percent by weight, and an acid number of from about 25 to 35.

11. The process of claim 10 conducted in a glass-lined vessel.

References Cited

UNITED STATES PATENTS

| | | | |
|---|---|---|---|
| 2,837,496 | 6/1958 | Vandenberg | 260—878 R |
| 3,082,192 | 3/1963 | Kirshenbaum et al. | 260—94.9 GC |
| 3,153,025 | 10/1964 | Bush et al. | 260—94.9 GC |
| 3,329,667 | 7/1967 | Braude et al. | 260—94.9 GC |
| 2,127,381 | 8/1938 | Herrmann et al. | 260—28.5 |
| 3,160,621 | 12/1964 | Hagemeyer et al. | 260—94.9 G |

HARRY WONG, JR., Primary Examiner

U.S. Cl. X.R.

260—28.5 D, 63 UY, 63 HA, 82.1, 85.7, 87.5 R, 87.5 A, 87.5 C, 87.5 G, 94.9 GC, 878 R